(12) United States Patent
Bissantz

(10) Patent No.: US 8,094,905 B2
(45) Date of Patent: Jan. 10, 2012

(54) SYSTEM FOR PROVIDING INFORMATION TO A USER

(75) Inventor: Nicolas Bissantz, Nuremberg (DE)

(73) Assignee: Dr. rer. Pl. Nicolas Blssantz, Nürnberg (DE)

( * ) Notice: Subject to any disclaimer, the term of this patent is extended or adjusted under 35 U.S.C. 154(b) by 1568 days.

(21) Appl. No.: 11/412,853

(22) Filed: Apr. 27, 2006

(65) Prior Publication Data

US 2007/0253613 A1 Nov. 1, 2007

(51) Int. Cl.
G06K 9/00 (2006.01)
(52) U.S. Cl. .................. 382/131; 382/128; 382/130
(58) Field of Classification Search .................. 382/131; 705/37; 715/774, 785, 760, 764, 227, 217; 345/440; 707/706, 722

See application file for complete search history.

(56) References Cited

U.S. PATENT DOCUMENTS

| | | | | |
|---|---|---|---|---|
| 5,276,679 | A * | 1/1994 | McKay et al. | 370/358 |
| 6,182,098 | B1 * | 1/2001 | Selker | 715/202 |
| 6,330,564 | B1 * | 12/2001 | Hellerstein et al. | 1/1 |
| 7,035,170 | B2 * | 4/2006 | Narayanaswami et al. | 368/223 |
| 7,068,288 | B1 * | 6/2006 | Good et al. | 345/619 |
| 7,243,105 | B2 * | 7/2007 | Thint et al. | 1/1 |
| 2002/0059594 | A1 * | 5/2002 | Rasmussen et al. | 725/37 |
| 2003/0061611 | A1 * | 3/2003 | Pendakur | 725/46 |
| 2003/0233425 | A1 * | 12/2003 | Lyons et al. | 709/217 |
| 2006/0047590 | A1 * | 3/2006 | Anderson et al. | 705/35 |
| 2007/0240066 | A1 * | 10/2007 | Bissantz | 715/760 |

OTHER PUBLICATIONS

Williams, "professional visual Basic 6 database", Aug. 2002,"Wrox press", pp. 562-563.*

* cited by examiner

Primary Examiner — Daniel Mariam
Assistant Examiner — Nancy Bitar
(74) Attorney, Agent, or Firm — Dilworth & Barrese, LLP.

(57) ABSTRACT

The present invention relates to a system for providing information to a user, said system comprising a screen for showing the information to the user, information generating means for generating at least one graphical and/or textual information, first selecting means for enabling the user to select at least one of said graphical and/or textual information, first generating means for generating first data which are related to said selected information, wherein said first data are grouped according to a criterion, changing means for changing said criterion to at least one further criterion, and triggering means which are adapted to trigger said changing means upon activation by the user of the system.

29 Claims, 4 Drawing Sheets

Fig. 4

| | | | | | | |
|---|---|---|---|---|---|---|
| 3" \|9,19" Revenues ▮▮▮▮▮▮▮▮▮▮ 19,5"[16"\|19,6"] | | Rebates ▮▮▮▮▮▮▮▮▮▮ 2,07"[878\|2,07"] | | Material Cost ▮▮▮▮▮▮▮▮▮▮ 352"[255\|352"] | | Labor |

Scenario: Actual; Presentation: Current
2005_Q4_11 ◆ Measures
Area ◆ Revenues

| Area | | Revenues |
|---|---|---|
| Eastern North | ▮▮▮▮▮▮▮▮▮▮ | 15.862.161 |
| Central South | ▮▮▮▮▮▮▮▮ | 1.076.824 |
| Central North | ▮▮▮▮▮▮▮ | 737.137 |
| Mountain South | ▮▮▮▮▮▮ | 541.362 |
| Pacific North | ▮▮▮▮▮ | 434.937 |
| Mountain North | ▮▮▮▮▮ | 390.919 |
| Eastern South | ▮▮▮▮ | 249.510 |
| Pacific South | ▮▮▮ | 211.208 |
| Sum | | 19.504.076 |

Area: Eastern North
2005_Q4_11 ◆ Measures
Customer ◆ Revenues

| Customer | | Revenues |
|---|---|---|
| United Nations Organ | ▮▮▮▮▮▮▮▮▮▮ | 12.327.892 |
| MCI | ▮▮▮▮▮▮▮▮ | 2.535.199 |
| Delson | ▮▮▮▮▮ | 356.599 |
| GoodChairs | ▮▮▮▮▮ | 278.907 |
| DecoArt | ▮▮▮ | 87.741 |
| Alberg Sys | ▮▮▮ | 80.168 |
| Sternberg | ▮▮ | 56.617 |
| Chico | ▮▮ | 42.867 |
| Miller & Gold | ▮▮ | 32.819 |
| Cairo | ▮ | 27.192 |
| Marriott Hotel | ▮ | 15.526 |
| Albert & Albert | ▮ | 12.435 |
| Almimo | | 5.862 |
| Magna Lumina | | 1.647 |
| Bosses Home | | 612 |
| Creative Interiors | | 95,74 |
| Sum | | 15.862.181 |

Fig. 5

| | | | | | | |
|---|---|---|---|---|---|---|
| 3" \|9,19" Revenues ▮▮▮▮▮▮▮▮▮▮ 19,5"[16"\|19,6"] | | Rebates ▮▮▮▮▮▮▮▮▮▮ 2,07"[878\|2,07"] | | Material Cost ▮▮▮▮▮▮▮▮▮▮ 352"[255\|352"] | | Labor |

Scenario: Actual; Presentation: Current
2005_Q4_11 ◆ Measures
Area ◆ Revenues

| Area | | Revenues |
|---|---|---|
| Eastern North | ▮▮▮▮▮▮▮▮▮▮ | 15.862.181 |
| Central South | ▮▮▮▮▮▮▮▮ | 1.076.824 |
| Central North | ▮▮▮▮▮▮▮ | 737.137 |
| Mountain South | ▮▮▮▮▮▮ | 541.362 |
| Pacific North | ▮▮▮▮▮ | 434.937 |
| Mountain North | ▮▮▮▮▮ | 390.919 |
| Eastern South | ▮▮▮▮ | 249.510 |
| Pacific South | ▮▮▮ | 211.208 |
| Sum | | 19.504.076 |

Area: Eastern North
2005_Q4_11 ◆ Measures
Customer ◆ Revenues

| Customer | | Revenues |
|---|---|---|
| United Nations Organ | ▮▮▮▮▮▮▮▮▮▮ | 12.327.892 |
| MCI | ▮▮▮▮▮▮▮▮ | 2.535.199 |
| Delson | ▮▮▮▮▮ | 356.599 |
| GoodChairs | ▮▮▮▮▮ | 278.907 |
| DecoArt | ▮▮▮ | 87.741 |
| Alberg Sys | ▮▮▮ | 80.168 |
| Sternberg | ▮▮ | 56.617 |
| Chico | ▮▮ | 42.867 |
| Miller & Gold | ▮▮ | 32.819 |
| Cairo | ▮ | 27.192 |
| Marriott Hotel | ▮ | 15.526 |
| Albert & Albert | ▮ | 12.435 |
| Almimo | | 5.862 |
| Magna Lumina | | 1.647 |
| Bosses Home | | 612 |
| Creative Interiors | | 95,74 |
| Sum | | 15.862.181 |

Customer: Marriott Hotel
2005_Q4_11 ◆ Measures
Product Category ◆ Revenues

| Product Category | | Revenues |
|---|---|---|
| Standards | ▮▮▮ | 15.526 |
| Sum | | 15.526 |

Fig. 6

| 3"]9,19" Revenues ▮▮▮▮▮ 19,5"[16" [19,6"] | | Rebates ▮▮▮▮▮ 2,07"[878 [2,07"] | | Material Cost ▮▮▮▮▮ 352" [255 [352] | | Labor | |
|---|---|---|---|---|---|---|---|
| Scenario: Actual; Presentation: ☒ | | Scenario: Actual; Presentation: ☒ | | Scenario: Actual; Presentation: ☒ | | Scenario: Actual; Presentation: ☒ | Scenario: Actual; Present |
| 2004_Q4_12 Measures | | 2005_Q1_1 Measures | | 2005_Q1_2 Measures | | 2005_Q1_3 Measures | 2005_Q2_1 Measur |
| Area ⇔ Revenues | | Area ⇔ Revenues | | Area ⇔ Revenues | | Area ⇔ Revenues | Area ⇔ Reven |
| Eastern North | 17.267.783 | Eastern North | 13.875.276 | Eastern North | 14.634.615 | Eastern North 16.711.923 | Eastern North 17.67 |
| Central South | 617.907 | Mountain North | 519.592 | Central South | 660.404 | Central South 638.410 | Central North |
| Central North | 500.032 | Central North | 506.715 | Mountain North | 437.363 | Mountain South 580.664 | Mountain South |
| Pacific North | 284.162 | Central South | 479.015 | Central North | 405.004 | Central North 520.909 | Mountain North |
| Mountain North | 269.603 | Mountain South | 379.940 | Mountain South | 207.504 | Mountain North 221.176 | Eastern South |
| Pacific South | 84.611 | Pacific North | 142.021 | Pacific South | 205.855 | Eastern South 170.845 | Central South |
| Eastern South | 79.015 | Eastern South | 120.191 | Pacific North | 169.347 | Pacific North 111.979 | Pacific North |
| Mountain South | 73.414 | Pacific South | 26.766 | Eastern South | 94.068 | Pacific South 79.126 | Pacific South |

Fig. 7

| 3"]9,19" Revenues ▮▮▮▮▮ 19,5"[16" [19,6"] | | Rebates ▮▮▮▮▮ 2,07"[878 [2,07"] | | Material Cost ▮▮▮▮▮ 352" [255 [352] | | Labor | |
|---|---|---|---|---|---|---|---|
| Scenario: Actual; Presenta ☒ | | Scenario: Actual; Presenta ☒ | | Scenario: Actual; Presenta ☒ | | Scenario: Actual; Presenta ☒ | Scenario: A |
| 2004_Q4_12 Measures | | 2005_Q1_1 Measures | | 2005_Q1_2 Measures | | 2005_Q1_3 Measures | 2005_Q2_4 Measures 2005_Q2_5 |
| Sales Group ⇔ Revenues | | Sales Group ⇔ Revenues | | Sales Group ⇔ Revenues | | Sales Group ⇔ Revenues | Sales Group ⇔ Revenues Sales Group |
| Sales Group A | 10.133.378 | Sales Group A | 8.083.659 | Sales Group B | 8.853.299 | Sales Group B 10.008.468 | Sales Group B 9.408.997 Sales Group |
| Sales Group B | 9.043.948 | Sales Group B | 7.955.658 | Sales Group A | 7.860.987 | Sales Group A 9.026.445 | Sales Group A 8.317.168 Sales Group |

SYSTEM FOR PROVIDING INFORMATION TO A USER

BACKGROUND OF THE INVENTION

The present invention is directed to a system for providing information to a user.

The term "information" used in connection with the present invention comprises any kind of data, such as graphical or textual information, numerical values etc.

In order to display a large amount of information in a compact and intelligible form it is known from the prior art to use so-called sparklines which are word-sized, minimized diagrams. Sparklines provide dense information in small spaces. The system does not necessitate a complex and time-consuming loading of databases and calculation of reports by the user. For example exchange rate movements, sports results, temperature variations etc. may easily be illustrated by use of such word-sized graphics.

Sparklines for example consist of a column and/or bar diagram in which the columns/bars represent values, such as for example turnover-values for different months. Each of said values usually represents a calculated aggregate value, for example a mean value, a gross-margin-share or a sum of values, for example the sum of turnover-values for different areas, customers etc. In other words, it is conceivable that each value of the sparkline represents a calculated aggregate value, such as a sum of values which may be grouped/sorted according to certain criteria.

SUMMARY OF THE INVENTION

It is the object of the present invention to provide a system for providing information to a user which is adapted to provide a large amount of data to the user while requiring minimum interaction by the user.

This object is solved by a system according to the description herein. The system comprises a screen for showing the information to the user, information generating means for generating at least one graphical and/or textual information, first selecting means for enabling the user to select said information, first generating means for generating first data which represent said selected information, wherein said first data are grouped according to a criterion, changing means for changing said criterion to at least one other criterion, and triggering means which are adapted to trigger said changing means upon activation by the user of the system.

The user may for example activate the triggering means by operating a mouse button, a mouse wheel or a key of a keyboard. Such activation results in a change of the criterion in accordance to which the first data are sorted. For example revenues for a certain period of time may be separated into first data which may be sorted according to the kind of sold items, to the sales area, to the sales staff etc. In accordance with a preferred embodiment of the invention the criteria in accordance to which the data are grouped may be changed by turning a mouse wheel so that the user is enabled to easily obtain an overview over the selected information which in the present example is the revenue for a certain period of time.

It is conceivable that the data grouped by further criteria are displayed in addition or as an alternative to the data which are grouped by the criterion previously selected.

The graphical information may have any form and content and for example comprises one or more line diagrams and/or bar diagrams.

The graphical information may be a column or bar of the bar diagram. As mentioned above such column may be part of a sparkline which shows a large amount of information to a user in a small space. The textual information may be a word or a number. The displayed information may for example be a sparkline showing a number of columns or bars each representing a revenue for a certain month. The user may select a certain of said columns/bars and upon activation for example by a mouse click will obtain a report comprising one, two or more than two first data representing said selected information, i.e. for example said revenue for the selected month. These first data are grouped by a certain criterion such as the kind of sold items, the sales area, the sales staff etc.

Upon activation by the user this criterion is changed to another criterion so that the user is enabled to easily review the selected information, in the present example the revenue for a certain month of the fiscal year, under several different aspects.

It is further conceivable that the first selecting means are adapted to enable the user to select a graphical and/or textual information which represents two or more than two data which are linked to and represented by said graphical and/or textual information or to select a group of graphical and/or textual information and that the first generating means are adapted to generate first data for at least some or all of said data which are represented by said selected graphical and/or textual information.

In this case the user is enabled to obtain information for a group of data linked to a selected information or to a group of selected information preferably simultaneously. In the above example the user is not only interested in data referring to one month of a fiscal year but to all months of the fiscal year. In this case the first generating means will generate data for each of the columns/bars which each represent a month of the fiscal year. This selection may for example be made by choosing the interested items by use for example of the mouse pointer or by selecting a label for the required information, such as for example the expression "Revenues".

Said first data may be grouped according to a criterion and the changing means may be adapted for changing said criterion to at least one further criterion for each of said first data upon activation by said triggering means. For example the first generating means are adapted to generate data for each of the months of the fiscal year which have been selected. For example, each of the data is grouped according to the criterion "Sold Items". Upon activation of the triggering means by the user this criterion may change to "Sales Region" for all of the sets of data, i.e. for all months which have been selected.

The changing means may be adapted to change the criteria for all sets of first data simultaneously. Alternatively, it is conceivable that the changing means are adapted to change the criteria for each of said sets of first data independently from each other, for example only for a particular month of the fiscal year.

In accordance with a further embodiment of the invention said criterion and/or further criteria is/are identical for all first data or variable for different first data. Referring to the above example, the criterion which is applied first for all months may be "sold items". In this case, it is preferable that the change of the first to any further criterion is also identical for all sets of data.

Alternatively, the criterion in accordance to which the data are grouped initially may vary from information to information, in the present example from month to month, so as to provide the user with the most significant information for each selected information.

As mentioned above, said graphical and/or textual information may comprise a label designating the kind of information, such for example the term "Revenues". In this case it is conceivable that the first generating means are adapted to generate first data associated with said label upon selecting the label by the first selecting means. In other words, it is sufficient for the user to select the label which corresponds to a selection of any information which is linked to this label. The user thereafter will receive reports, i.e. data, at least some of which containing data representing the selected information. In the present example the user has not to select a number of columns of a sparkline, but merely selects the term "Revenues" in order to obtain data for each of the selected columns of the sparkline which are preferably displayed on the screen simultaneously.

In accordance with a preferred aspect of the invention the system comprises second selecting means for enabling the user to select first data generated by the first generating means and second generating means for generating one, two or more than two second data which represent said selected first data. The first selecting means are adapted to enable the user to select a certain information which is displayed on the screen. As explained above this selection results in a generation of first data. The second selecting means allow the user to select one or more of these first data, so as to obtain further information associated therewith. Referring to the above example, the first data may be a list of data grouped according to the criterion "Sales Areas". These first data may for example be displayed as sparkline. If the user selects a certain column of this sparkline, i.e. a certain sales area, the second generating means will generate second data which represent the selected first data, i.e. the selected sales area.

These second data are grouped by a further criterion such as "sold items" for the particular selected sales area.

The second data may be sorted according to a criterion, wherein the changing means are adapted to change said criterion to at least one further criterion, and wherein the changing means are triggered by triggering means which are adapted to trigger said changing means upon activation by the user of the system.

Identically to the change of the criterion of the first data the user may easily trigger a change of the criterion of the second data, for example by use of the mouse wheel.

The above mechanism of course is not limited to two data levels but may be continued for an unlimited number of data levels. Accordingly the system may comprise $n^{rd/th}$ (n>2; n is an integer) selecting means for enabling the user to select $(n-1)^{nd/rd/th}$ data generated by the $(n-1)^{nd/rd/th}$ generating means and $n^{rd/th}$ generating means for generating two or more than two $n^{rd/th}$ data which represent said selected $(n-1)^{nd/rd/th}$ data. The change of the criteria may proceed identically as described above.

The criterion according to which the first and/or second and/or further data are grouped may be predetermined by the user.

Preferably, the criterion according to which the first and/or second and/or further data are grouped upon activation of the selection means by the user is determined according to the spread of the data for different criteria, wherein the criterion having the highest spread of data is initially selected.

If for example the criteria in accordance to which the revenues may be analyzed are the sales areas, the sales staff and the sold items and if the spread of data is the highest for the sales areas and the lowest for the sold items, the system will initially group the data according to the criterion sales area, thereafter according to the criterion sales staff and thereafter according to the criterion sold items. As mentioned above, the change of the criteria will proceed upon activation of the triggering means by the user of the system.

Accordingly, the changing means may be adapted to change the criteria so that a criterion having a higher spread of data is selected prior to a criterion having a lower spread of data.

In accordance with a further embodiment of the invention the generating means may be adapted to allow display only of those data which contribute to the sum of data to a certain minimum extent. If for example the sales staff is composed of four persons A, B, C, D and A and B in total contribute to the total revenue to 70% (or any other value) no further display takes place referring to persons C and D. This value may be determined by the user of the system or automatically calculated by the system with regard to the current data set.

Further, the $n^{rd/th}$ (n >2) generating means may be adapted to disallow selection of those data which are smaller than a extent than the next larger data. If for example the revenues for person A are 50% higher than that of person B, person B is also disallowed for further display to the user. This extent may also be determined by the user of the system or automatically calculated by the system with regard to the current data set.

As mentioned above, in a preferred embodiment of the invention the graphical and/or textual information and/or the data comprise at least one sparkline and/or a label and/or value.

In order to increase the content of the information provided by the system, the system may comprise means for zooming the sparkline. These means for zooming the sparkline may be adapted to create a space on one or both sides of a column or bar or other representation of data of the sparkline and to provide one or more values explaining the absolute or relative values of the column/bar/representation into said space(s).

Further, the system may comprise moving means which are adapted to move said at least one graphical and/or textual information, for example sparklines, on the screen. In this embodiment of the invention it is possible to provide a large amount of information on the screen without user interaction. The moved graphical and/or textual information for example are sparklines with or without additional textual and/or numerical values referring to the sparklines.

In accordance with a further embodiment of the invention the system comprises means for deleting or replacing data generated by the first and/or any further generating means on the screen. Accordingly, it is possible to delete or to replace data with have been generated by any of the generating means on the screen if required. For example the system may provide a button on the screen which upon activation for example by use of the mouse pointer deletes displayed data. Further it is conceivable that data which are displayed on the screen are replaced by other data if the user selects another graphical and/or textual information or data by said selecting means.

BRIEF DESCRIPTION OF THE DRAWINGS

Further advantages and embodiments of the invention are explained on the basis of the figures.

FIGS. 1-11 show screen shots of a computer screen displaying various data and sets of data which are displayed upon request by the user of the system.

FIG. 1 schematically illustrates a computer screen displaying features in accordance with the present invention and selecting one of the displayed features;

FIG. 2 schematically illustrates the computer screen of FIG. 1 which has been altered to display different features;

FIG. 3 schematically illustrates the computer screen of FIG. 2 and displaying additional features and selecting one of the displayed features;

FIG. 4 schematically illustrates the computer screen of FIG. 2 displaying different additional features from the computer screen of FIG. 3 and selecting one of the displayed features;

FIG. 5 schematically illustrates the computer screen of FIG. 4 displaying additional features and selecting one of the displayed features;

FIG. 6 schematically illustrates a computer screen displaying different features from FIGS. 1-5 and selecting one of the displayed features;

FIG. 7 schematically illustrates a computer screen displaying different features from FIGS. 1-6;

FIG. 8 schematically illustrates a computer screen displaying different features from FIGS. 1-7;

FIG. 9 schematically illustrates selecting one of the features displayed on the computer screen of FIG. 8;

FIG. 10 schematically illustrates the computer screen of FIG. 8 which has been altered to display different features and selecting one of the displayed features; and FIG. 11 schematically illustrates the computer screen of FIG. 8 and selecting a different feature displayed on the computer screen.

DESCRIPTION OF THE PREFERRED EMBODIMENTS

Figure 1:
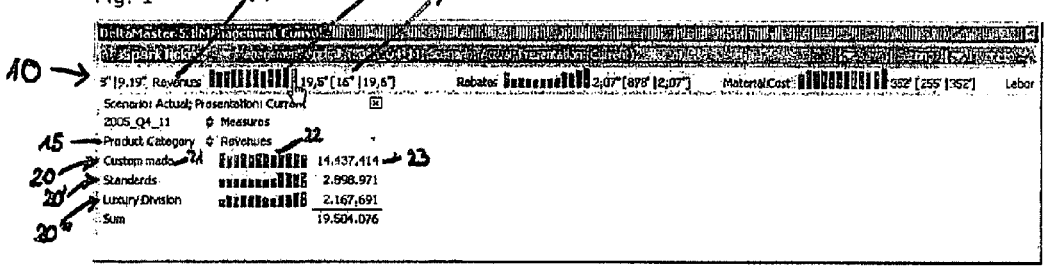

FIG. 1 shows a data line 10 which is either stationary or moves over the screen of a computer or any other device having a screen such as a cell phone.

Data line 10 comprises several sets of information which are composed of labels 11, sparklines 12 and numerical values 13. The left hand set which is depicted in FIG. 1 has the label 11 "Revenues", a sparkline 12 in form of a vertical-column diagram and numerical values 13 which represent the last displayed value (19,5"), the smallest (16") and the largest (19,6) value of the sparkline 12.

Each of the columns of the sparkline 12 represent a revenue-value for a particular month.

The number of data lines 10 and their orientation on the screen is arbitrary and may vary according to the users needs. The same applies for the number of sets of information in each data line 10 and the kind of graphical and/or textual information.

The data line 10 is generated by information generating means.

If the user is interested in obtaining data related to the last of the depicted columns of sparkline 12 the user moves the mouse pointer to the respective column and performs a mouse click and thereby activates the first generating means which are adapted to generate first data. In the present example according to FIG. 1 these first data are three data sets 20, 20' and 20" which are each composed of a label, a sparkline and a numerical value which represents the value underlying the last column of the sparkline. In this example label 21 of the first data set 20 is "Custom made", the sparkline 22 of the first data set 20 is a column diagram and the value 23 of the first data set is "14.437.414" which is the revenue for the item "Custom made" for the selected month, i.e. for the selected column of the sparkline 12.

As may be gathered from FIG. 1 the category 15 which has been selected by the system is "Product Category" which covers the items "Custom made", "Standards" and "Luxury Division". Value 23 for the product "Custom made" as well as the values for the products "Standards" and "Luxury Division" in total amount to 19.504.076 which corresponds to the value underlying the column of the sparkline 12 which has been selected by the user. Similarly, the summarization of the columns of the sparklines of the data sets 20, 20' and 20" results in the respective column of sparkline 12 from the higher level.

An alternative category to the category "Product category" is the category "Area" which shows the revenues dependent on different sales areas. However, the system initially selects the category "Product Category" based on the following decision. The system calculates the spread of values in each category and based thereon determines the standard deviation. The category having the highest standard deviation is selected by the system as initial category which is initially displayed to the user. The category with the next lower standard deviation is displayed to the user as next category etc.

Figure 2:
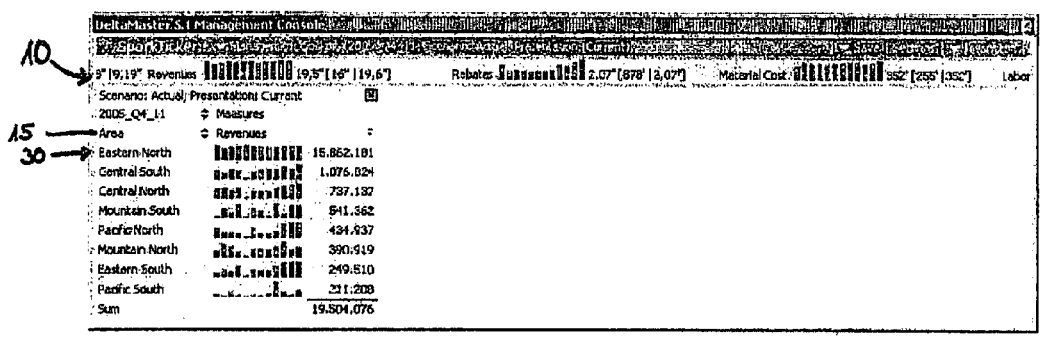

If the user wishes to change the category "Product Category" displayed on the screen in FIG. 1 to another category the user has to activate the triggering means which trigger the changing means for changing the category by turning the wheel of mouse of the system and then obtains a screen representation according to FIG. 2. As may be gathered from FIG. 2 the category 15 has changed from "Product category" to "Area". As may be further gathered from FIG. 2, the category "Area" comprises more data as the category "Product Category".

The selected column of the sparkline 12 is separated into the several values each representing a revenue for a certain sales area. Again, in total the sum of the single area-related revenues amounts to the value underlying the selected column of the sparkline 12, namely to 19.504.076.

This process may be continued by the user for any conceivable category which is available for the selected column of the sparkline by simply turning the mouse wheel. By this way the selected information may easily be reviewed with respect to various aspects while requiring minimum user action.

The above mechanism may be performed for any of the selected information of the data line 10.

Figure 3:
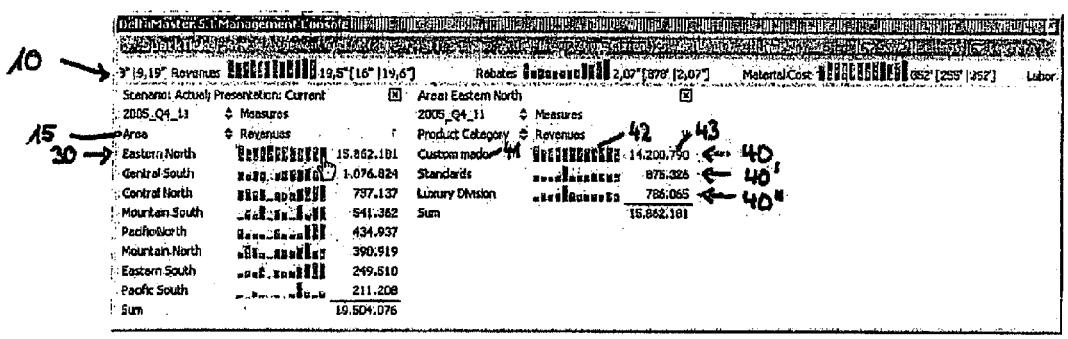

FIG. 3 in the left hand portion corresponds to FIG. 2. In the example shown in FIG. 3 the user is further interested in data related to the current value of sparkline 30 which represents the current revenue for the area "Eastern North". The user moves the mouse pointer to the respective column of sparkline 30 and performs a mouse click which activates the second generating means for generating second data. These second generating means are adapted to generate three second data in form of data sets 40, 40' and 40" which again are composed of a label, a sparkline and a numerical value.

In this example label 41 of the first data set 40 is "Custom made", the sparkline 42 is a column diagram and the numerical value 43 is "14.200.790" which is the revenue for the item "Custom made" for the selected area (Eastern North) and for the selected month, i.e. for the selected column of the sparkline 30. The sum of the numerical values for the three categories "Custom made", "Standards" and "Luxury Division" (15.862.181) is of course identical to the numerical value of data set 30 in FIG. 3.

Directing the pointer of the mouse to the central portion of the screen which displays said second data and turning the mouse wheel triggers the changing means which change the category from "Product Category" to another category. In the present example, this further category is "Customer". The corresponding screen view is shown in FIG. 4. FIG. 3 depicts the last value of sparkline 30 (15.862.181) separated in values in category "Product Category" and FIG. 4 separated in values in category "Customers". Accordingly, it is possible to review the current revenues for the area "Eastern North" under several differing aspects.

Directing the mouse pointer to the left hand portion of the screen which displays said first data and turning the mouse wheel triggers the changing means which change the category from "Area" to another category, while the second generating means deletes the representation in the central portion of FIG. 3 (as in FIG. 2) if the category of the left hand portion is changed.

FIG. 5 shows the case in which the user is interested in data related to the current revenue value underlying the last column of the sparkline of a particular customer. In this case, again, the user directs the mouse pointer to the respective column und performs a mouse click which activates third generating means which generate third data in form of data sets which are depicted in the right hand portion of the screen view in FIG. 5. In this portion of the figure the revenues of a particular area for a particular customer are shown in the category "Product Category" which in the present example is composed merely of a single data set. This category may be changed by turning the mouse wheel as described above.

As is shown in FIGS. 3 and 5 the data generated by the nth generating means are displayed on the screen simultaneously with data of the next higher level generated by the $(n-1)^{th}$ generating means.

FIG. 5 shows a button for each of the three columns of data besides "Scenario Actual; Presentation: Current", "Area: Eastern North" and "Customer: Mariott Hotel" in form of a cross in a quadratic frame. Activating this button by the user, for example by use of the mouse pointer, results in a deletion of the display of the respective data column. It is also conceivable to replace the displayed data dependent on the selection of data or information by the user. For example, if the user in FIG. 5 changes the selection from "Eastern North" to "Central South" it is preferably provided that the second data column in FIG. 5 is changed accordingly so as to display the customers for the Area "Central South" without the necessity to previously delete the currently displayed data of the second column in FIG. 5. Further, in this case it is preferably provided that the right data column is deleted on the screen automatically.

FIG. 6 shows a case in which the user is not interested in receiving data related to a particular column of sparkline 12 but to all columns of sparkline 12. In this case the user either selects the interesting columns from sparkline 12 or the label of the sparkline 12 which in the present case is the label "Revenues". The term "Revenues" is a textual information which is linked and represents the data underlying the sparkline which is displayed besides this term. The term "Revenues" and the data of the sparkline are linked insofar, as a selection of this term is interpreted as a selection of a set of data. In the present example these data are the data underlying the sparkline which is displayed besides the selected term "Revenues".

In this case the first generating means generate first data for each of the selected columns of sparkline 12. The first data are data sets comprising the information described with respect to FIG. 1 or 2.

As may be gathered in FIG. 6 the criterion ("Area") is identical for all first data.

If the user wishes to change the criterion the user has to operate the mouse wheel which results in a change of the criterion for all data. In the present example the criterion changes from "Area" to the category "Sales Group" (FIG. 7).

Figure 8:
Figure 9:
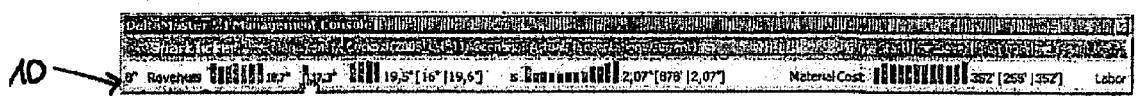

FIG. 8 depicts a data line 10 with different sets of data, wherein each of said sets of data comprises a sparkline. In order to obtain more information, the user is enabled to activate zooming means which are adapted to provide the user with additional information related to the sparkline. As shown in FIG. 9 the user selects a column from the sparkline and is provided with the current value of the selected column as well as from the previous column. Both values are represented in spaces created on both sides of the selected column.

Figure 10:
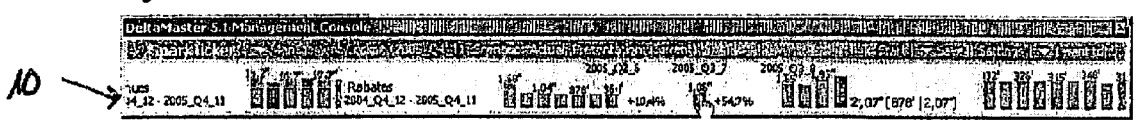
Figure 11:
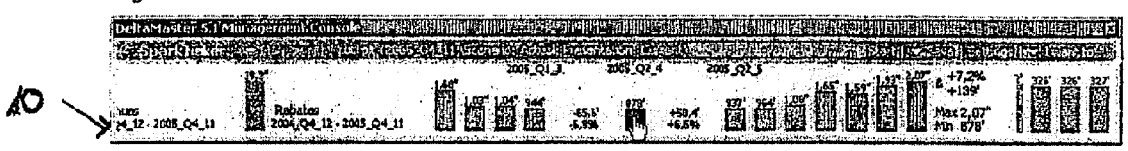

In addition or alternatively absolute and/or relative changes between the selected column and the previous or succeeding column may be represented as shown in FIGS. 10 and 11.

The invention claimed is:

1. System for providing information to a user, said system Comprising:
    a screen for showing the information to the user,
    information generating means for generating at least one of graphical and/or textual information,
    first selecting means for enabling the user to select at least one of said graphical and/or textual information,
    first generating means for generating first data which is related to said selected information,
    wherein said first data is grouped for display to the user according to a first criterion out of a plurality of available criteria,
    changing means for changing said first criterion to at least one second criterion out of said plurality of available criteria, and
    triggering means for triggering said changing means upon activation by the user of the system such that upon activation of the triggering means said first data is grouped for display to the user according to said second criterion.

2. The system according to claim 1, wherein the triggering means are formed by a mouse or a keyboard of a computer.

3. The system according to claim 2, wherein the triggering means are formed by a mouse button, by a mouse wheel or by a key of a keyboard.

4. The system according to claim 1, wherein the graphical information comprises a line diagram and/or a bar diagram.

5. The system according to claim 4, wherein the graphical information is a column or bar of the bar diagram.

6. The system according to claim 1, wherein the textual information is a word or a number.

7. The system according to claim 1, wherein the first selecting means for enabling the user to select a graphical and/or textual information which represents two or more data which are represented to said graphical and/or textual information and wherein the first generating means for generating generate first data for at least some or all of said data which are represented by said graphical and/or textual information.

8. The system according to claim 7, wherein the first data are grouped according to a first criterion and wherein the changing means are adapted for changing said first criterion to said at least one second criterion for each of said first data upon activation by said triggering means.

9. The system according to claim 8, wherein the changing means changes the first criterion for all first data simultaneously.

10. The system according to claim 8, wherein the changing means for changing the first criterion for each of said first data independently from each other.

11. The system according to claim 7, wherein said first criterion and said second criterion are identical or differing for the first data related to the two or more than two of said data which are represented by the selected graphical and/or textual information.

12. The system according to claim 7, wherein said first data representing at least some or all of said data which are linked to said selected graphical and/or textual information are shown simultaneously on the screen.

13. The system according to claim 1, wherein said graphical and/or textual information comprises a label designating the kind of information.

14. The system according to claim 13, wherein the first generating means for generating first data associated with said label upon selecting the label by the first selecting means.

15. The system according to claim 1, wherein the system comprises second selecting means for enabling the user to select first data generated by the first generating means and second generating means for generating second data which are related to said selected first data.

16. The system according to claim 15, wherein said second data are grouped according to a first criterion, wherein the changing means for changing said first criterion to said at least one second criterion, and wherein the changing means are triggered by triggering means for triggering said changing means upon activation by the user of the system.

17. The system according to claim 15, wherein the system comprises $n^{rd/th}$ (n is an integer >2) selecting means for enabling the user to select $(n-1)^{nd/rd/th}$ data generated by the $(n-1)^{nd/rd/th}$ generating means and $n^{rd/th}$ generating means for generating $n^{rd/th}$ data which are related to said selected $(n-1)^{nd/rd/th}$ data.

18. The system according to claim 1, wherein the criterion according to which the first and/or second and/or further data are grouped is predetermined by the user.

19. The system according to claim 1, wherein a selected criterion according to which the first and/or second and/or further data are initially grouped as constituting said first criterion is determined according to the spread of the data for different criteria and wherein the selected criterion to be initially displayed to the user is the criteria determined as having the highest spread of data.

20. The system according to claim 1, wherein the changing means changes the first criterion so that a second criterion having a higher spread of data is selected prior to a third criterion having a lower spread of data.

21. The system according to claim 1, wherein the first generating means is display a subset of data comprising based on a predetermined criteria.

22. The system according to claim 21, wherein the predetermined criteria is determined by a user or is otherwise automatically determined by the system.

23. The system according to claim 1, wherein the graphical and/or textual information and/or the data comprise at least one sparkline and/or a label and/or value.

24. The system according to claim 23, wherein the system comprises means for zooming the sparkline.

25. The system according to claim 24, wherein the means for zooming the sparkline create a space on one or both sides of a column/bar of the sparkline and to provide one or more values explaining the absolute or relative values or changes of a selected column / bar of the sparkline into said space(s).

26. The system according to claim 1, wherein the system comprises moving means move said at least one graphical and/or textual information, for example sparklines, on the screen.

27. The system according to claim 1, wherein the system comprises means for deleting or replacing displayed data generated by the first and/or any further generating means on the screen.

28. System for providing information to a user, said system comprising:
- a screen for showing the information to the user,
- information generating means for generating at least one of graphical and/or textual information,
- first selecting means for enabling the user to select said at least one of said graphical and/or textual information,
- first generating means for generating first data which is related to said selected information,
- wherein said first data is grouped for display to the user according to a first criterion out of a plurality of available criteria such that said first data is displayed as at least a first data set comprising a first label, said first data set and said first label being defined by said first criterion,
- changing means for changing said first criterion to at least a second criterion out of said plurality of available criteria, and
- triggering means for triggering said changing means upon activation by the user of the system such that upon activation of the triggering means said first data is grouped for display to the user according to said second criterion such that said first data is displayed as at least a second data set comprising a second label, said second data set and said second label being defined by said second criterion.

29. System for providing information to a user, said system comprising:
- a screen for showing the information to the user,
- information generating means for generating at least one of graphical and/or textual information,
- first selecting means for enabling the user to select said at least one of said graphical and/or textual information,
- first generating means for generating first data which is are related to said selected information,
- wherein said first data is grouped for display to the user according to a user changable criterion
- wherein said first data comprises at least one data set comprised of a label and at least one sparkline or at least one numerical value according to said grouping as defined by said user changable criterion,
- changing means for changing said user changable criterion to at least one further criterion, and triggering means for triggering said changing means upon activation by the user of the system.

* * * * *